UNITED STATES PATENT OFFICE.

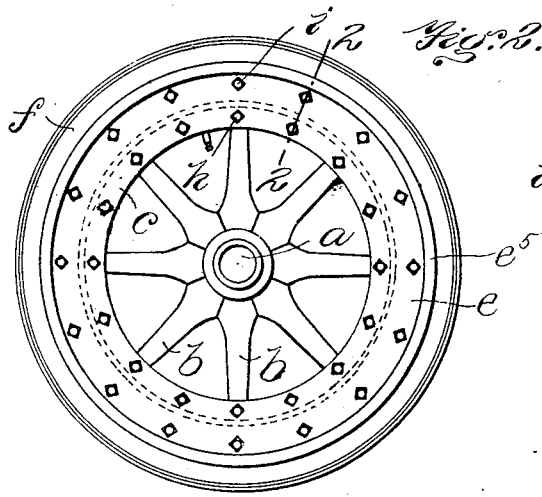
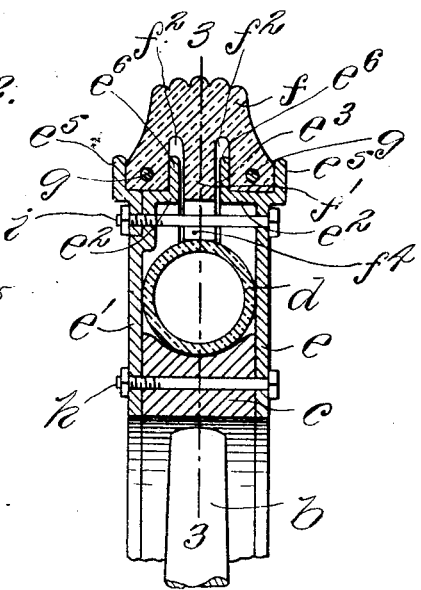
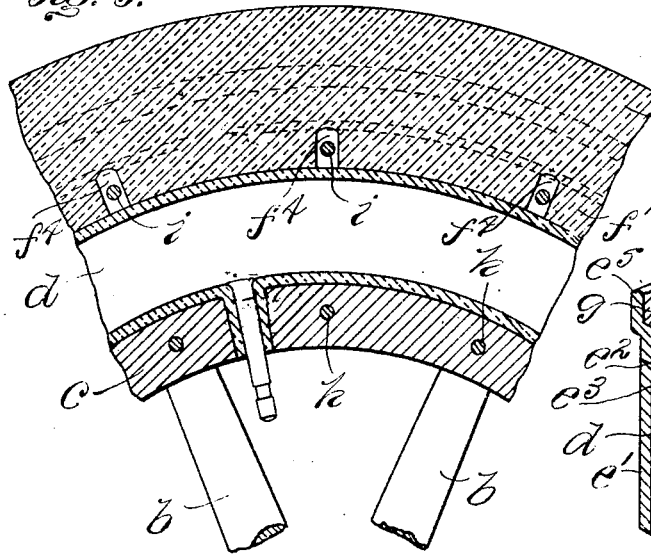
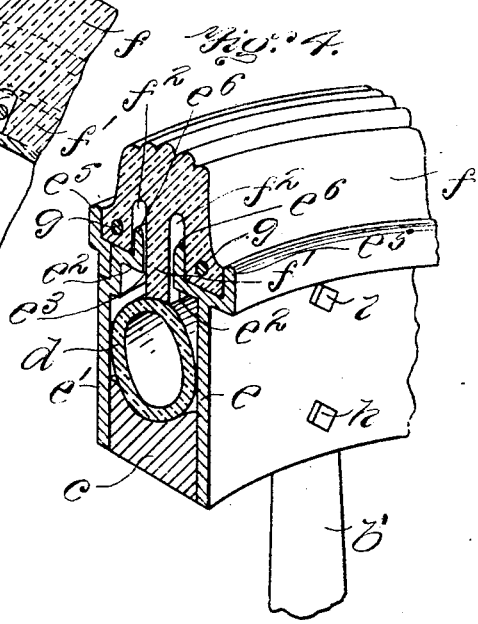

WINFIELD J. MITCHELL AND JAMES R. MITCHELL, OF LYNN, MASSACHUSETTS.

VEHICLE-WHEEL.

No. 803,500. Specification of Letters Patent. Patented Oct. 31, 1905.

Application filed October 3, 1904. Serial No. 226,900.

*To all whom it may concern:*

Be it known that we, WINFIELD J. MITCHELL and JAMES R. MITCHELL, of Lynn, in the county of Essex and State of Massachusetts, have invented certain new and useful Improvements in Vehicle-Wheels, of which the following is a specification.

This invention relates to wheels for automobiles and other vehicles having tread-surfaces which are supported by an inflated tube or pneumatic cushion.

The invention has for its object to provide a wheel of this character in which the air-tube shall be protected in such manner as to prevent the puncturing of the tube by nails, pieces of glass, and other objects which may be encountered by the tires of vehicle-wheels.

To this end the invention consists in the improvements which we will now proceed to describe and claim.

Of the accompanying drawings, forming a part of this specification, Figure 1 represents a side view of a vehicle-wheel embodying our invention. Fig. 2 represents a section on line 2 2 of Fig. 1. Fig. 3 represents a section on line 3 3 of Fig. 2. Fig. 4 represents a sectional perspective view of a portion of the wheel.

The same reference characters indicate the same parts in all the figures.

In the drawings, $a$ represents the hub, $b$ the spokes, and $c$ the rim or felly, of a vehicle-wheel, said parts being rigidly connected in the usual or any suitable way and constituting a rigid wheel-body.

$d$ represents an air-tube adapted to be inflated to form a pneumatic cushion and bearing on the rim or felly $c$.

$e\ e'$ represent annular plates affixed by bolts $h$ to the rim $c$ and projecting outwardly at opposite sides of the tube $d$. Said plates are provided with flanges $e^2\ e^2$, which project inwardly over the tube $d$ and constitute annular tire-seats which are separated from each other by a circumferential slot or opening $e^3$.

$f$ represents a tire preferably composed wholly or in part of rubber and having two bases or base portions which bear permanently on the seats $e^2\ e^2$. The tire is provided with an inwardly-projecting flange or leg $f'$, which is preferably integral with the tire $f$, and therefore (preferably) composed of elastic material, although the said leg may be made of rigid material, if desired. The leg $f'$ bears on the tube $d$ and is yieldingly supported by the latter. The said leg is movable toward and from the hub of the wheel and is yieldingly supported by the tube $d$ and the body of air confined therein, the tire $f$ being also yieldingly supported through said leg.

The tire $f$ is preferably provided with internal grooves $f^2\ f^2$, which separate the base of the leg $f'$ from the side portions of the tire and increase the flexibility of the tire, the said grooves permitting the tread-surface of the tire to yield inwardly and to be supported more directly by the air-tube $d$ than would be the case if the grooves $f^2$ were not employed.

The tire $f$ may be secured in any suitable way. We have here shown wires $g\ g$ embedded in the base portions of the tire and extending around the same, said wires being connected at their ends to form continuous bands in a common and well-known manner. Provision is thus made for holding the base portions of the tire in contact with the tire-seats. Edgewise displacement of the tire is or may be prevented by ears $e^5\ e^5$, formed on or affixed to the seats $e^2\ e^2$, said ears bearing against the opposite sides of the base portions of the tire. If desired, the seats $e^2$ may be provided with inner ears $e^6\ e^6$, which enter the grooves $f^2$ in the tire and bear against the inner surfaces of the side portions of the tire.

The plates $e\ e'$ may be secured to the rim $c$ by means of bolts $h$, passed through the rim-plates. The outer portions of the plates $e$ and $e'$ may be connected by bolts $i$, said bolts passing through slots $f^4$, formed for their reception in the leg $f'$. The slots $f^4$ are preferably elongated, as shown in Figs. 2 and 3, to prevent contact between the leg and the bolts $i$ when the leg moves inwardly.

It will be seen from the foregoing that the air-tube $d$ is protected by the plates $e\ e'$, the flanges $e^2\ e^2$, the leg $f'$, and the tire $f$. The leg $f'$ practically closes the opening $e^3$, which opening is the only avenue for the access of a puncturing-body to the air-tube. It is evident, therefore, that no puncturing-body encountered by the wheel can reach the tire until it has penetrated the leg $f'$, a result which is extremely unlikely to occur.

The rim $c$, the plates $e\ e'$, and the seats $e^2\ e^2$ constitute a chambered rigid rim, the inner wall of which is the rim $c$, while the outer wall is composed of the seats $e^2$ $e^3$. The said chamber incloses and protects the air-tube, and the tire-leg projecting between the parts of the outer wall furnishes an additional protection for the air-tube.

The two-part rigid tire-seat and the elastic tire having two base portions bearing permanently on the parts of said seat and confined against displacement thereon laterally, inwardly, or outwardly are important structural features of our invention, particularly as embodied in wheels for motor-vehicles, the said features insuring a secure engagement of the elastic tire with the wheel-rim and at the same time permitting the tread portion of the tire and the leg $f'$ to yield freely inwardly.

We claim—

1. A vehicle-wheel comprising a rigid rim, a pneumatic cushion bearing on said rim, annular plates attached rigidly to and projecting outwardly from the rim at opposite sides of the cushion, said plates having inwardly-projecting tire-seats surrounding the cushion and each having two outwardly-projecting ears, and an elastic tire having base portions bearing on the said seats between said ears and having a leg projecting inwardly between the seats and supported by the pneumatic cushion.

2. A vehicle-wheel comprising a rigid rim, a pneumatic cushion bearing on said rim, annular plates attached rigidly to and projecting outwardly from the rim at opposite sides of the cushion, said plates having inwardly-projecting tire-seats surrounding the cushion and each having two outwardly-projecting ears, and an elastic tire having base portions bearing on the said seats between the ears thereof and having a leg projecting inwardly between the seats and supported by the pneumatic cushion, the said tire being internally grooved to separate the leg from the base portions of the tire.

3. A vehicle-wheel comprising a rigid rim, a pneumatic cushion bearing on said rim, annular plates attached rigidly to and projecting outwardly from the rim at opposite sides of the cushion, said plates having inwardly-projecting tire-seats surrounding the cushion, each seat having two outwardly-projecting ears, and an elastic tire having two base portions bearing on said seats and laterally supported at both sides by said ears, and a leg projecting inwardly between the seats and supported by the cushion.

4. A vehicle-wheel comprising a rigid rim, a pneumatic cushion bearing on said rim, annular plates attached rigidly to and projecting outwardly from the rim at opposite sides of the cushion, said plates having inwardly-projecting tire-seats surrounding the cushion, each seat having two outwardly-projecting ears, and an elastic tire having two base portions bearing on said seats and laterally supported at both sides by said ears, and a leg projecting inwardly between the seats and supported by the cushion, the said tire being internally grooved to separate the leg from the base portions of the tire and to receive the inner ears on said seats.

5. A vehicle-wheel comprising a chambered rigid rim having an inner seat, and two rigid outer seats separated by a peripheral opening, a pneumatic cushion bearing on the said inner seat, and an elastic tire having base portions bearing on the said outer seats and having also an inwardly-projecting leg which passes through said opening and is supported by the pneumatic cushion, the said outer seats having means for preventing lateral displacement in either direction, of the base portions of the elastic tire.

In testimony whereof we have affixed our signatures in presence of two witnesses.

WINFIELD J. MITCHELL.
JAMES R. MITCHELL.

Witnesses:
CHARLES LEIGHTON,
WILLIAM J. BARRY.